Feb. 22, 1966  J. H. TROLL  3,237,099
INDICATOR HAVING CALIBRATED FILAMENTS FOR
PREDICTING COMPONENT FAILURE
Filed June 16, 1961

INVENTOR
John H. Troll

BY
Fisher, Christen & Goodson
ATTORNEYS

United States Patent Office 3,237,099
Patented Feb. 22, 1966

3,237,099
INDICATOR HAVING CALIBRATED FILAMENTS FOR PREDICTING COMPONENT FAILURE
John H. Troll, 133 Collins Road, Waban 68, Mass.
Filed June 16, 1961, Ser. No. 117,684
7 Claims. (Cl. 324—68)

This invention relates to a life indicator for components and more particularly, to an electrically energized indicator for accurately predicting the imminent approach of the end of the useful life of an electrical or mechanical component.

A serious maintenance problem arises in large computer installations or other large-scale electronic systems, or the like, wherein thousands of interconnected modules or operating components are employed. Since, in complex machinery of this type, the components are functionally interrelated, the failure of any one module or component can shut down the entire operation of the equipment until the fault has been located.

All components of the nature employed in equipment of this type, whether electrical or mechanical may be statistically analyzed as to the length of their useful life. This useful life or component life may be predicted on the basis of two primary functions with which a preferred embodiment of this invention, as illustrated herein, is concerned. First, there are equipment components or modules which are constantly energized or are de-energized so rarely as to be assumed to be in constant use. Second, there are equipment components or modules in which the number of on-off cycles or duty cycles determines the major wear or deterioration factor which limits the useful life of the component.

Since the most serious problem is one of component failure and location of the faulty component, it is a primary object of this invention to provide suitable means for indicating the impending or imminent approach of the end of the component life so that the said component may be replaced prior to the time at which failure is predicted.

Another object of this invention is to provide means whereby an indication of proximity to the end of the useful life of a substantially continuously energized component may be provided.

Another object of this invention is to provide means whereby an indication of proximity to the end of the useful life of a component as a function of the total number of duty cycles thereof may be provided.

Another object of this invention is to provide means whereby a multiple indication of component life is provided including a first or warning indication of the approach of the end of the useful life and a subsequent or final indication of the immediate proximity of the end of the useful life of the component.

Another object of this invention is to provide a completely self-contained plug-in indicator unit for providing an indication of the useful or component life of an equipment module or component.

Still another object of this invention is to provide means whereby an indication of component failure prior to the end of the useful life thereof may be provided.

Yet another object of this invention is to provide means whereby the indication of useful or component life of an element will be completely reliable.

These and other objects of this invention will become apparent with reference to the following specification and drawings which relate to several preferred embodiments of this invention.

Figure 1:
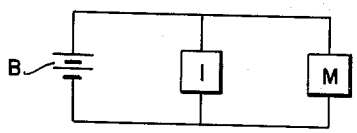
FIGURE 1 is a block diagram of a circuit embodiment including the present invention.

Referring in detail to the drawings and more particularly to FIGURE 1, the indicator means I comprising the present invention is shown connected in parallel with the electrically energized equiment module or component M whereby the imminent approach of the end of the useful life of the component M may be predicted. Both the indicator I and the module M are connected across a suitable voltage source shown as a battery B.

Figure 2:
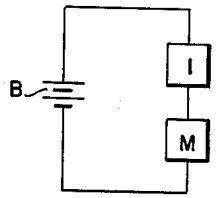
FIGURE 2 is a block diagram of another circuit embodiment including the present invention.

Referring now to FIGURE 2, the indicator I is shown to be connected in series with the energy source B and the equipment module M whereby the indicator is also sensitive to failure of the equipment module M prior to the energization of the indicator I by its self-contained means responsive to the useful life of the module M.

One embodiment of the invention will now be described with reference to FIGURE 3. The indicator is shown parent or transluscent envelope 10 and a sealed base 12 for the envelope. Any standard base such as an octal base, or any other base which may specifically be adapted for connection in circuit with a module or component, may be utilized as the base 12.

Connections to the interior of the envelope 10 are made through the base 12 by a pair of contact pins 14 extending therethrough. The pins 14 are extended internally of the envelope 10 in the form of two electrically conductive support members 16.

Across the upper ends of the support members 16 is mounted a calibrated lamp filament 18 which is designed to fail in operation after a predetermined period of time or after a predetermined number of duty cycles of operation whereby the lamp will be extinguished to indicate that the calibrated life thereof has been exhausted.

For filaments in which the calibration is on the basis of total time of constant energization, as an analog function of the useful life of the module or component being monitored, the filament 18 is mounted loosely between relatively rigid support members 16 such that the failure of the filament is simply a function of the burn-out rate thereof.

For filaments in which the calibration is on the basis of the number of duty cycles in which it is energized as an analog function of the useful life of the module or component being monitored, the filament 18 is mounted in tension between two spring-type support members 16 which apply the tensile bias thereto. Thus, every energization of the filament 18 over a duty cycle, said duty cycle being any given on-off energization, imports thermal and physical shock to the filament 18 by way of the expansion and contraction of the filament 18 against the bias of the spring-type supports 16. The filament 18 can be calibrated such that a predetermined number of duty cycles creates a fatigue failure.

Thus, when the lamp no longer lights over the duty cycle of a component or module, that component or module is either near the end of its useful life or has failed depending on whether the circuit of FIGURE 1 or FIGURE 2 is used.

For either of the above-described calibrations, it is essential that the calibration be based on a standard voltage either constantly or intermittently applied across the filament. In the embodiment shown in FIGURE 3, the voltage across the filament 18 is controlled by a thermistor 20 in the form of a thin iron strip bridged across the supports 16 intermediate the ends thereof and connected in parallel with the filament 18. The thermistor 20 is calibrated such that the change in resistance thereof in response to variations in current flow therethrough acts to produce a constant voltage drop across the thermistor 20 and hence, across the filament 18.

Figure 5:
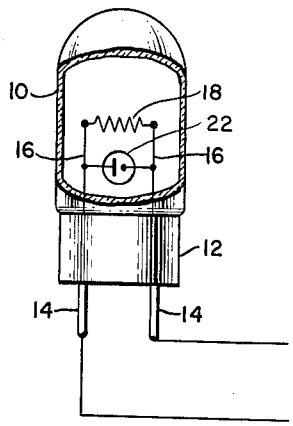
FIGURE 5 is a schematic of another embodiment of the invention.
Figure 6:
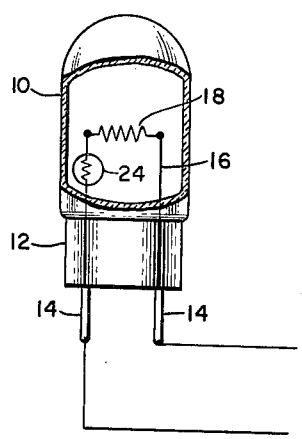
FIGURE 6 is a modification of FIGURE 3.

Alternative embodiments operating on the same theory are shown in FIGURES 5 and 6. In FIGURE 5 a voltage regulator (VR) tube is shown connected across the supports 16 internally of the indicator lamp which places the VR tube 22 in shunt with the filament 18 to maintain a constant voltage thereacross. In FIGRE 6, a thermistor element 24 is shown mounted within the lamp and connected in series with the filament 18 to provide a variable resistance whereby the voltage drop across the filament 18 will remain constant.

In equipments where utmost reliability is desired over an extended number of hours, it is quite possible that the component life would end during the extended operating period. Thus, in situations of this type a warning indication of the approach of the final warning, or the imminent termination of the component life, a prescribed number of hours prior to the final warning is necessary.

Figure 4:
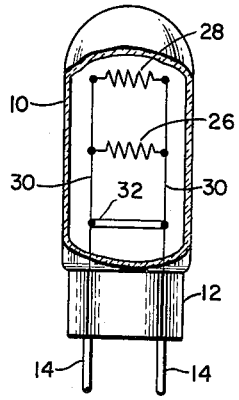
FIGURE 4 is a schematic of another embodiment of the invention.

Referring now to FIGURE 4, a further embodiment of the invention is shown for the accomplishment of the two stage indication outlined above.

Figure 3:
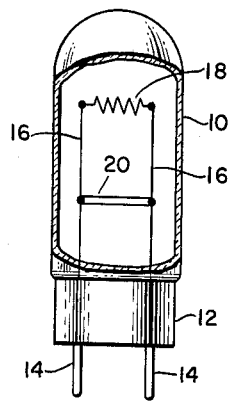
FIGURE 3 is a schematic of one embodiment of the invention.

The single filament of FIGURES 3, 5 and 6 is replaced by a pair of filaments 26 and 28 connected in parallel with one another and mounted between a pair of support members 30 which are internal extensions of the lamp. A thermistor 32 is also mounted in shunt with the two filaments 26 and 28 between the support members 30 for the purpose of maintaining a constant voltage across the filaments.

The filaments 26 and 28 may both be mounted for the continuous energization indicating function or may both be mounted for the duty cycle indicating function as desired. Since both filaments when energized present a different combined resistance than when individually energized, the indicator lamp will produce light of a different color based upon the condition of the equipment module being monitored.

When duty cycle and length of time of energization are equally important in determining useful component life, one filament may be calibrated for duty cycle and the other may be calibrated for the continuously energized life of the modules or component being monitored. Thus, in this case, a change of color of the light produced by the filaments would indicate imminent failure of a component as to one of its two modes of operation.

It is to be understood that the subject invention does not have to be placed in a circuit with the equipment module or component which is being monitored.

For monitoring mechanical components it is sufficient that the indicator be independently energized and switched on when the mechanical component is in use. Particularly in the case of components which are always energized as long as the system of which they are a part is in operation, a panel of the indicator lights of this invention could be established wherein a new indicator is placed in a labelled or coded socket each time an equipment module is replaced in the system to provide a constant tally of component life without any additional circuitry being added to the module.

As can be seen from the foregoing description, this invention provides an accurate, reliable and versatile self-contained plug-in indicator for monitoring the useful or component life of equipment modules and components. It is to be understood that the embodiments shown and described herein are for the purpose of example only and are not intended to limit the scope of the appended claims.

What is claimed is:

1. Means for providing an indication of the termination of the useful life of an equipment component and previous indications of a predetermined fraction of the said useful life in advance of the indication of termination thereof comprising a source of electric energy, a lamp having connector means for engagement with said source and including a plurality of filaments therein concurrently energized with said component from said source and each having a predetermined operating life at a predetermined voltage calibrated with respect to the predicted length of the useful life of said component, the operating life of one filament differing from the operating life of another of the filaments such that each of the filaments will fail after an individually predetermined fraction of the useful life of said component has elapsed, and self-contained voltage regulating means contained within said lamp in a circuit with said filaments to maintain said filaments at said predetermined voltage, whereby a quantitative indication of the remaining useful life of said component is provided.

2. The invention defined in claim 1 wherein the said filaments are responsive to the total time of continuous energization of said component.

3. The invention defined in claim 1 wherein the said filaments are responsive to the total number of duty cycles of operation of said component.

4. The invention defined in claim 1 including a thermistor mounted internally of said lamp and connected in series with said filaments to provide a regulated constant voltage drop across said filaments.

5. The invention defined in claim 1 including voltage regulating means connected in shunt with said filaments to provide a constant predetermined voltage across said filaments.

6. The invention defined in claim 5 wherein said voltage regulating means is a thermistor comprising a thin iron strip, and a pair of spaced wire support means is provided in said lamp, said filaments and said iron strip being connected between said wires.

7. The invention defined in claim 5 wherein said voltage regulating means comprises a gas-filled tube mounted internally of said lamp.

References Cited by the Examiner

UNITED STATES PATENTS

| | | | |
|---|---|---|---|
| 2,007,921 | 7/1935 | Braselton | 315—309 X |
| 2,518,909 | 8/1950 | Krakauer | 340—251 |
| 2,791,473 | 5/1957 | Mattox. | |
| 2,917,814 | 12/1959 | Ruckelshaus | 324—68 |
| 2,945,179 | 7/1960 | Winn | 324—68 |

WALTER L. CARLSON, *Primary Examiner.*

SAMUEL BERNSTEIN, *Examiner.*